(12) United States Patent
Konno et al.

(10) Patent No.: US 6,429,626 B1
(45) Date of Patent: Aug. 6, 2002

(54) BATTERY PACK

(75) Inventors: Chiho Konno, Kanagawa; Bunya Sato, Fukushima, both of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/569,902

(22) Filed: May 11, 2000

(30) Foreign Application Priority Data

May 13, 1999 (JP) .............................. 11-133364

(51) Int. Cl.[7] ................................................ H02J 7/24
(52) U.S. Cl. ....................................................... 320/164
(58) Field of Search ................... 320/164, 106, 320/104

(56) References Cited

U.S. PATENT DOCUMENTS

| | | | | |
|---|---|---|---|---|
| 4,577,144 A | * | 3/1986 | Hodgman et al. | 320/106 |
| 5,173,652 A | * | 12/1992 | Henkel | 320/104 |
| RE35,043 E | * | 9/1995 | Takeda | 320/101 |
| 5,717,315 A | * | 2/1998 | Maeno et al. | 320/106 |
| 5,998,962 A | * | 12/1999 | Akiya | 320/106 |

* cited by examiner

Primary Examiner—Gregory Toatley
Assistant Examiner—Pia Tibbits
(74) Attorney, Agent, or Firm—Frommer Lawrence & Haug LLP; William S. Frommer; Gordon Kessler

(57) ABSTRACT

The present invention enables to mount a primary cell to increase the battery capacity and to charge a secondary cell while the primary cell is mounted.

A select switch selects a first selectable terminal or a second selectable terminal having a higher voltage applied. A control circuit selects a secondary cell or a primary cell which can output a higher voltage and outputs voltage from that cell.

4 Claims, 7 Drawing Sheets

BATTERY PACK

BACKGROUND OF THE INVENTION

1. Field of the Invention

The present invention relates to a battery pack including a primary cell and a secondary cell.

2. Description of the Prior Art

A battery pack which can be charged is normally constituted by one type of secondary cell. The battery built in the battery pack is a primary cell or a secondary cell. Here, the primary cell may be a manganese cell, alkali cell, lithium cell, air cell, and the like. The secondary cell may be nickel-cadmium cell, nickel hydrogen cell, lithium-ion cell, lithium polymer cell, and the like.

For example, a drive battery pack for a portable telephone is normally constituted by one type of secondary cell which is a single lithium-ion cell. A battery pack serving as a drive source of a portable personal computer is constituted by one type of secondary cell which is one to nine cells. Moreover a battery pack serving as a drive power source for a portable video camera is constituted by a secondary cell which is one to nine cells.

In the aforementioned battery pack having a conventional secondary cell, when the battery capacity has become small, the battery pack should be charged using a charger and a domestic power source (AC100V) for several hours.

Accordingly, when a user uses an portable electronic apparatus outside home and no battery capacity is left, the user cannot use the portable electronic apparatus any more.

On the other hand, there has been suggested a battery pack which can drive a portable electronic apparatus using a primary cell instead of the secondary cell when the battery capacity become none. However, such a battery pack has a problem that the secondary cell cannot be charged while the primary cell is mounted.

SUMMARY OF THE INVENTION

It is therefore an object of the present invention to provide a battery pack which can mount a primary cell to increase the battery capacity and charge a secondary cell while the primary cell is mounted.

The battery pack according to the present invention achieves the aforementioned object by including: a primary cell; a secondary cell; an I/O terminal through which discharge voltage is output or charge voltage is input; select means for selecting a primary terminal connected to the primary cell or a secondary terminal connected to the secondary cell, so as to connect the selected terminal to the I/O terminal; comparison means for comparing the voltage of the primary cell and the secondary cell and, during discharge, controlling the select means so as to select the primary or the secondary terminal connected to a higher voltage, and during charge from an external power source, controlling the select means so as to select the secondary terminal; an inverse current preventing means for connecting the I/O terminal to the secondary cell, so that current flows from the I/O terminal to the secondary cell and not vice versa.

DESCRIPTION OF PREFERRED EMBODIMENTS

Hereinafter, explanation will be given on a first and second embodiment of the present invention with reference to the attached drawings.

Figure 1:
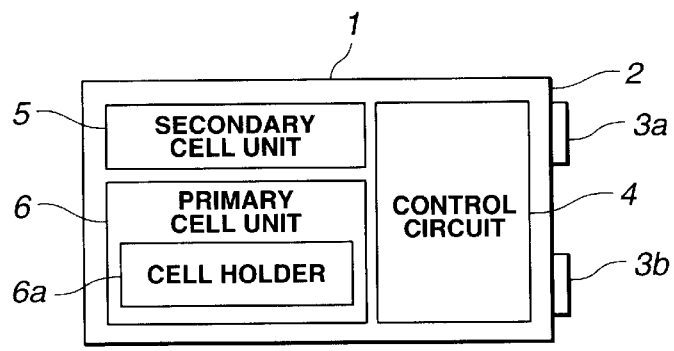
FIG. 1 shows a configuration of a battery pack according to the present invention.

The present invention, for example, can be applied to a battery pack 1 shown in FIG. 1.

The battery pack 1 includes a case 2 having a rectangular parallelepiped shape, a positive polarity external terminal 3a and a negative polarity external terminal 3b for outputting a discharge voltage and inputting a charge voltage. The battery pack 1 includes in the case 2: a control circuit 4 for preventing overcharge of the secondary cell; a secondary power source unit 5 consisting of one or more than one secondary cells; an a primary power source unit 6 consisting of one or more than one primary cells.

The secondary power source unit 5 includes a secondary cell. The secondary cell may be, for example, a nickel-cadmium cell, nickel hydrogen cell, lithium-ion cell, lithium polymer cell, and the like.

The primary cell unit 6 has a battery holder 6a which can be removed. The battery holder 6a mechanically holds the primary cell and connects the positive and negative electrodes of the primary cell to the control circuit 4. Here, the primary cell may be a manganese cell, alkali cell, lithium cell, air cell, and the like.

Figure 2:
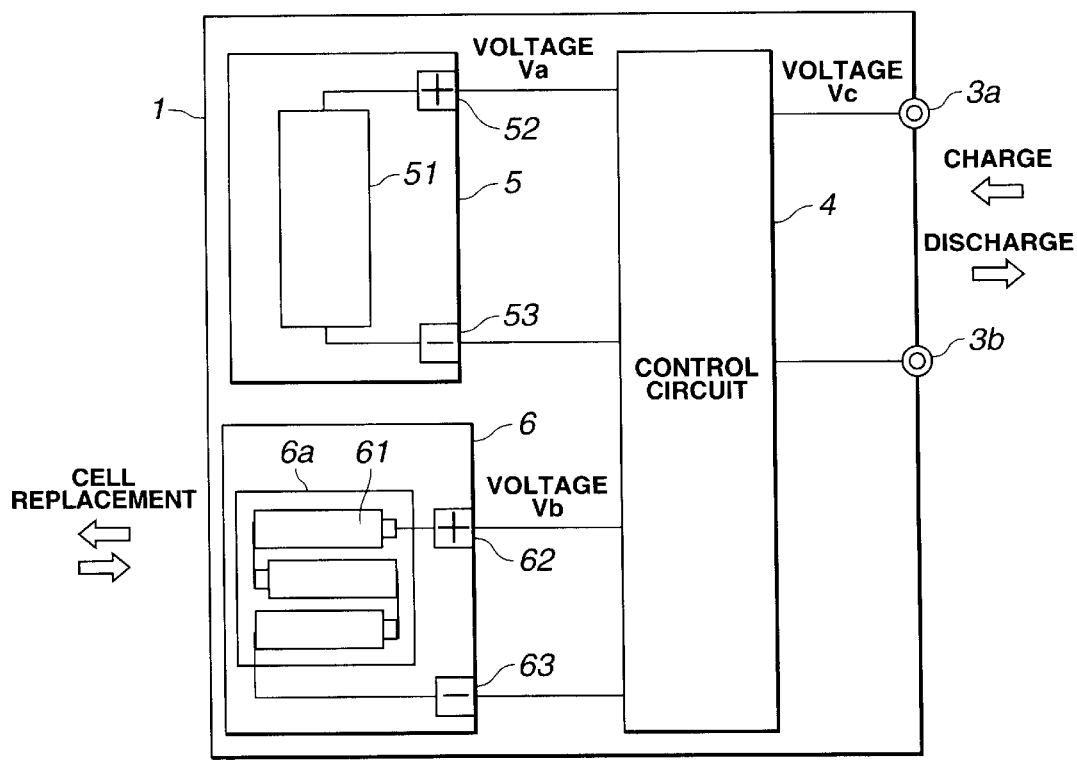
FIG. 2 shows a configuration of a battery pack according to the present invention.

Next, explanation will be given on the circuit configuration of the battery pack 1 with reference to FIG. 2.

The control circuit 4 is provided with voltage Va from the secondary power source unit 5 and voltage Vb from the primary power source unit 6. The control circuit 4 is connected to the positive electrode external terminal 3a and to the negative electrode external terminal 3b and via the positive electrode external terminal 3a and the negative electrode external terminal 3b, outputs a charge voltage outside and input power source from a charger (not depicted) to charge the secondary cell 51.

The secondary cell 51 is fixed to the secondary power source unit 5. Accordintly, the secondary cell 51 cannot be replaced.

The primary power source unit 6 has a detachable battery holder 61. Here, the battery holder 6a outputs voltage of the three primary cells 61 connected in series.

Next, explanation will be given on a specific configuration of the secondary power source unit 5 and the primary power source unit 6.

Figure 3D:
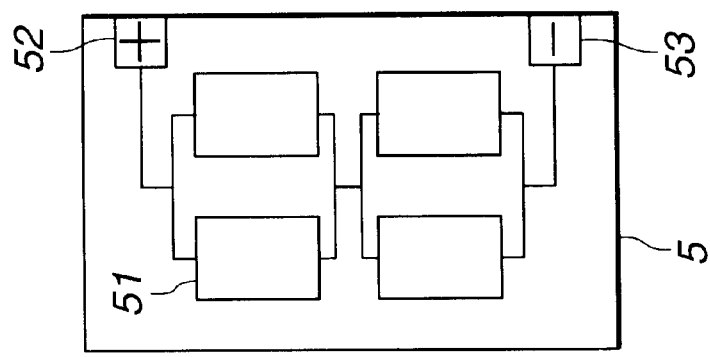
FIGS. 3A, 3B, 3C and 3D show various configurations patterns of a secondary power source unit.
Figure 3C:
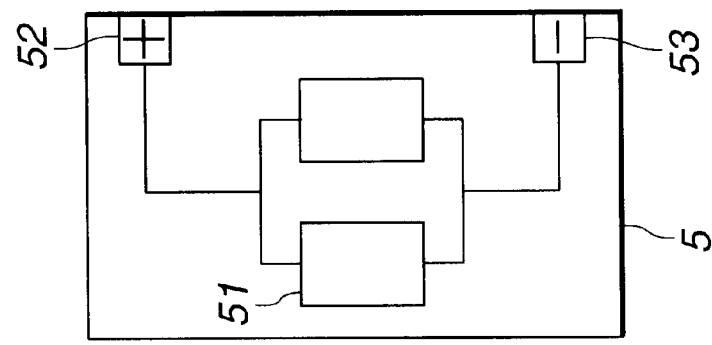
Figure 3B:
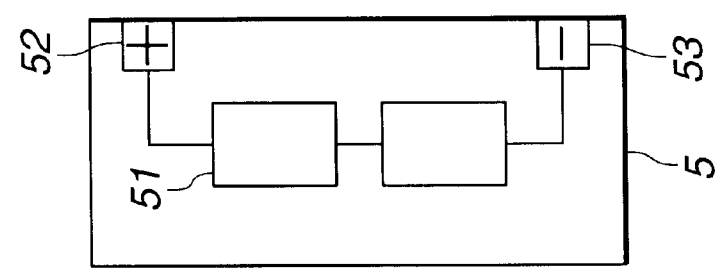
Figure 3A:
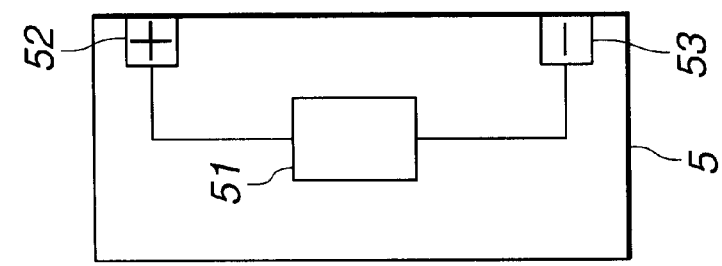

The secondary power source unit is constituted by one or more than one secondary cells 51. When only one secondary cell 51 is used, as shown in FIG. 3A, it is connected to the positive electrode terminal 52 and to the negative electrode terminal 53. When two of the secondary cells 51 are used, as shown in FIG. 3B, the two secondary cells 51 are connected in series and connected to the positive electrode terminal 52 and the negative electrode terminal 53. Moreover, when two secondary cells 51 are used, as shown in FIG. 3C, the two secondary cells are connected in parallel and connected to the positive electrode terminal 52 and to the negative electrode terminal 53. When four of the secondary cells are used, as shown in FIG. 3D, two secondary cells 51 connected in parallel are handled as one block and the two blocks are connected in series and connected to the positive electrode terminal 52 and the negative electrode terminal 53. It should be noted that when more than four secondary cells are used, the aforementioned blocks are connected din series and connected to the positive electrode terminal 52 and to the negative electrode terminal 53.

Figure 4D:
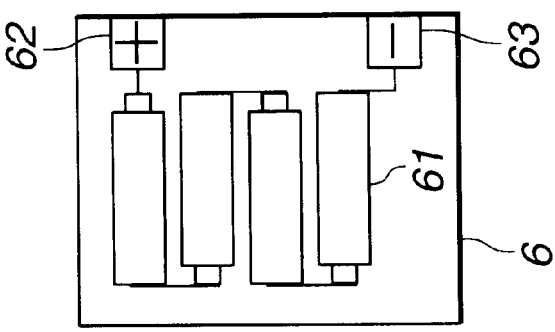
FIGS. 4A, 4B, 4C and 4D show various configurations patterns of a primary power source unit.
Figure 4C:
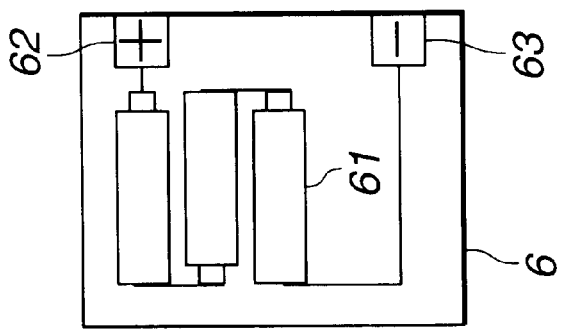
Figure 4B:
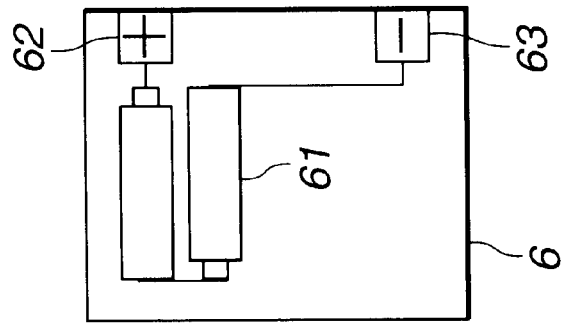
Figure 4A:
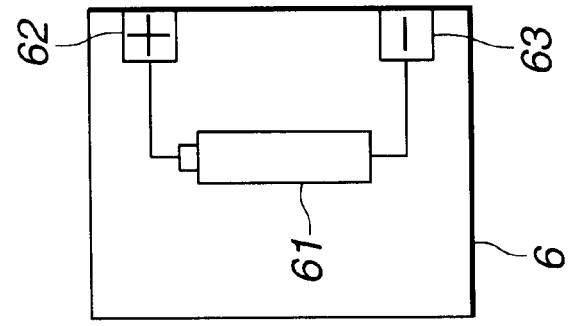

The primary power source unit 6 is constituted by one or more than one primary cells 61. In the explanation below, the battery holder 6a is omitted. When only one primary cell 61 is used, as shown in FIG. 4A, it is connected to the positive electrode terminal 62 and to the negative electrode terminal 63. When two of the primary cells 61 are used, for example, as shown in FIG. 4B, the primary cells are connected in series and connected to the positive electrode terminal 62 and the negative electrode terminal 63. When three or four of the primary cells 61 are used, as shown in FIG. 4C and FIG. 4D, the primary cells 61 are connected in series and connected to the positive electrode terminal 62 and the negative electrode terminal 63. It should be noted that two of the primary cells 61 may be connected in parallel as a block and the blocks are connected in series.

The secondary power source unit 5 and the primary power source unit 6 can be discharged and accordingly, their output voltage ranges are preferably the same. For this, it is necessary to make optimal the number of cells connected in series constituting the secondary power source unit 5 and the primary power source unit 6.

The output voltage of one secondary cell 51 is about 3.0V to 4.2V although differs according to the remaining capacity. The output voltage of one primary cell 61 is, in the case of alkali cell or manganese cell, about 0.9V to 1.6V although differs according to the remaining capacity. When three of the primary cells are connected in series, the entire voltage is 2.7V to 4.8V. That is, when the secondary power source unit 5 is constituted by a lithium-ion cell, the primary power source unit 6 is preferably constituted by three manganese cells.

On the other hand, when the secondary cell 51 constituting the secondary power source unit 5 is a nickel hydrogen cell, the voltage of one secondary cell 51 is 1.0V to 1.4V although differs according to the remaining capacity. That is, when the secondary power source unit 5 is constituted by one nickel hydrogen cell, the primary power source unit 6 is preferably constituted by one alkali cell or a manganese cell.

Next, explanation will be given on a specific configuration of the control circuit 4.

Figure 5:
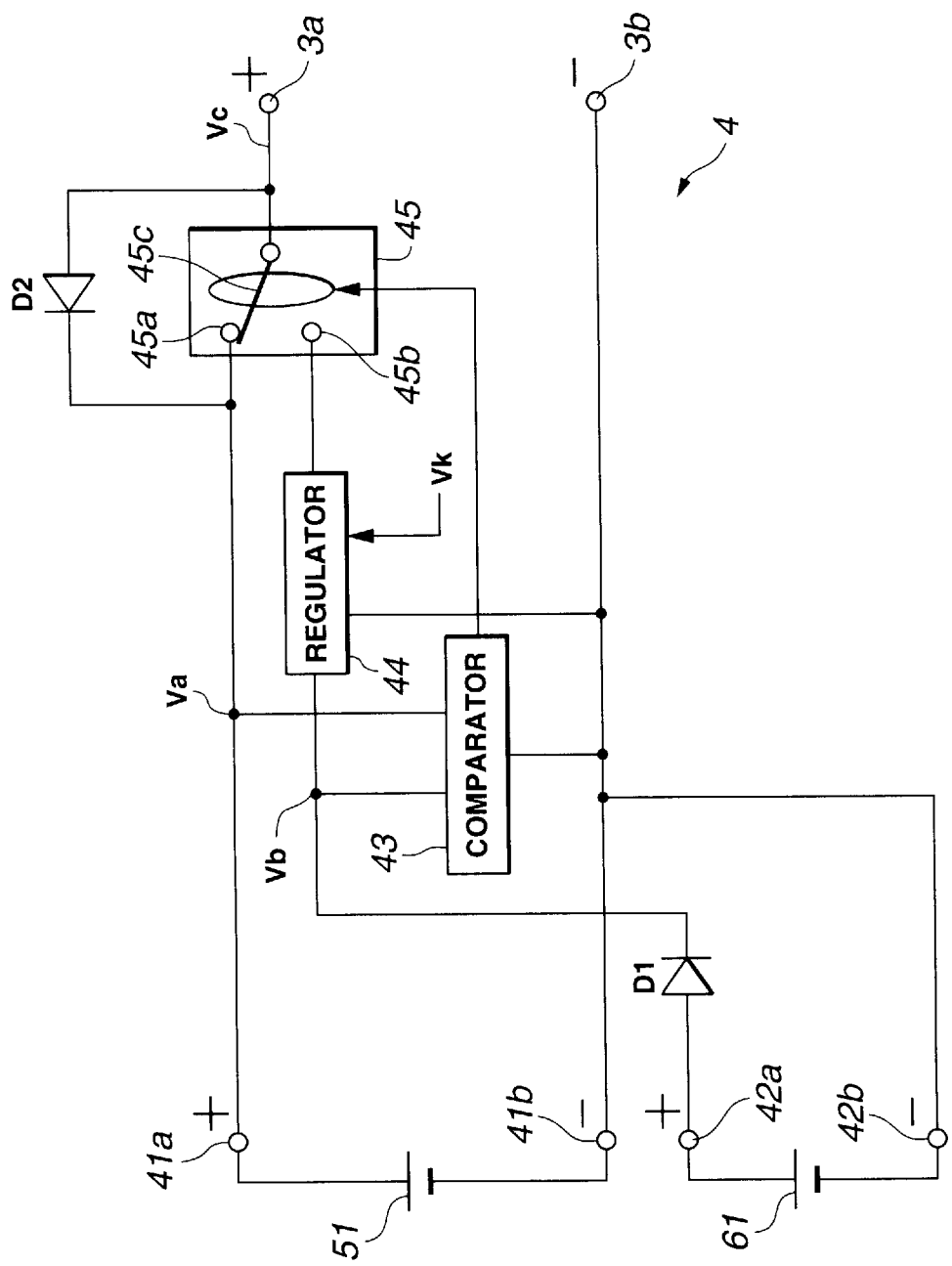
FIG. 5 is a circuit diagram showing a configuration of a control circuit of the aforementioned battery pack.

As shown in FIG. 5, the control circuit 4 includes: a diode D1 for preventing charging of the primary cell 61; a comparator 43 for comparing voltage of the secondary cell 51 and voltage of the primary cell 61; a voltage regulator 44 for regulating the voltage discharged from the primary cell 61 to a predetermined value or below; and a switching circuit 45 between discharge from the secondary cell 51 and the primary cell 61.

The first positive electrode terminal 41a is connected to a positive electrode of the secondary cell 51, and the first negative electrode terminal 41b is connected to a negative electrode of the secondary cell 51. The second positive electrode terminal 42a is connected to a positive electrode of the primary cell 61 and the second negative electrode terminal 42b is connected to a negative electrode of the primary cell 61. Furthermore, the first negative electrode terminal 41b, the second negative electrode terminal 42b, and the negative external terminal 3b are connected to one another.

The second positive terminal 42a is connected to the diode D1. The diode D1 has an anode connected to the positive terminal 42a and a cathode connected to the comparator. That is, the diode D1 is constituted in such a manner that only a discharge current from the primary cell 61 flows, so as to prevent charging of the primary cell 61. It should be noted that the diode D1 may be an ordinary rectifier diode, shot key barrier diode, or the like. The ordinary rectifier diode has a forward voltage of 0.6V to 1.0V and the shot key barrier diode has a forward voltage of 0.3V to 0.6V. Accordingly, it is preferable to use the shot key barrier diode for the diocde D1.

The comparator 43 is connected to the first negative electrode terminal 41b, to the first positive electrode terminal 41a, and via the diode D1 to the second positive electrode terminal 42a. The comparator 43 compares the voltage Va of the secondary cell 51 to the voltage Vb of the primary cell 61, and when the voltage Va of the secondary cell 51 is found to be higher, the comparator 43 turns on (logical H) the output signal for supply to the switching circuit 45. Moreover, when the voltage Vb of the primary cell 61 becomes higher, the comparator turns off (logical L) the output signal.

The voltage regulator control the voltage from the diode D1 for supply to the switching circuit 45. More specifically, the voltage regulator 44 determines whether the voltage from the diode D1 is greater than a predetermined threshold value Vk. If the voltage from the diode D1 is not greater than the threshold value Vk, the voltage is supplied directly to the switching circuit 45, and if the voltage from the diode D1 is greater than the threshold value Vk, the voltage is regulated to the threshold value Vk and before supplied to the switching circuit 45. This threshold voltage value Vk is a nominal charge voltage of the secondary cell 51 and, for example, is 4.1V when the secondary cell 51 is a lithium-ion cell. Thus, when the secondary cell 51 is charged from the primary cell 61, the voltage regulator 44 prevents charging by voltage higher than the nominal charge voltage of the secondary cell 51.

The switching circuit 45 includes a first selectable terminal 45a, a second selectable terminal 45b, and a select switch 45c, the first selectable terminal 45a (secondary side) is connected to the first positive electrode terminal 41a and the second selectable terminal 45b (primary side) is connected to the voltage regulator 44. The select switch 45c selects the first selectable terminal 45a or the second selectable terminal 45b and connects the selected terminal to the positive electrode external terminal 3a. The select switch 45c selects the first selectable terminal 45a when the output signal is on and selects the second selectable terminal 45b when the output signal has become off. That is, the select switch 45c selects a terminal having a higher voltage.

It should be noted that the switching circuit 45 is constituted by, for example, two transistors, two field effect transistors, or a single electromagnetic relay. Here, it is preferable that the switching circuit 45 be constituted by two field effect transistors.

Moreover, the first positive electrode terminal 41a is connected to the cathode of the diode D2 whose anode is connected to the positive electrode external terminal 3a. It should be noted that the diode D2 is preferably a shot key barrier diode which has a comparatively low forward voltage.

In the battery pack 1 having the aforementioned configuration, the select switch 45c selects the first selectable terminal 45a or the second selectable terminal 45b which has a higher voltage applied. Accordingly, the control circuit 4 selects the secondary cell 51 or the primary cell 61 which can output a higher voltage so that voltage is output from that cell.

When the secondary cell 51 has discharged and its voltage has become lower than the voltage of the primary cell 61, the select switch 45c selects the second selectable terminal 45b. Thus, the control circuit 4 can discharge the voltage of the primary cell 61 externally.

When the voltage of the secondary cell 51 has become low and should be charged, the secondary cell 51 has a voltage lower than the voltage of the primary cell 61. Accordingly, the select switch 45c selects the first selectable terminal 45a. The primary cell 61 supplies voltage to the secondary cell 51 via the voltage regulator 44, the switching circuit 45, and the diode D2. Thus, the secondary cell 51 is charged by the voltage of the primary cell 61.

Moreover, it is also possible to charge using an external charger (not depicted). When the battery pack 1 is mounted on the charger (not depicted), the charger applies a charge voltage to the positive electrode external terminal 3a and the negative electrode external terminal 3b. This charge voltage is supplied via the diode D2 to the secondary cell 51. The secondary cell 51 is charged by the charger.

As has been described above, the select switch 45c selects a terminal having a higher voltage and accordingly, the battery pack 1 can select the secondary cell 51 or the primary cell 61 having a higher voltage for discharge externally.

The battery pack 1 including the diode D1 can prevent charge of the primary cell 61 from the secondary cell 51 or the charger (not depicted). Here, the battery pack 1 not only charges the secondary cell 51 by the charger but also can charge the primary cell 61 when no charger is used.

In the battery pack 1, when the secondary cell 51 is charged by the primary cell 61, the voltage regulator 44 controls the voltage to the predetermined threshold value Vk or below. Accordingly, even if the primary cell 61 has a voltage above the nominal charge voltage of the secondary cell 51, the voltage is made lowered for charge.

Figure 6:
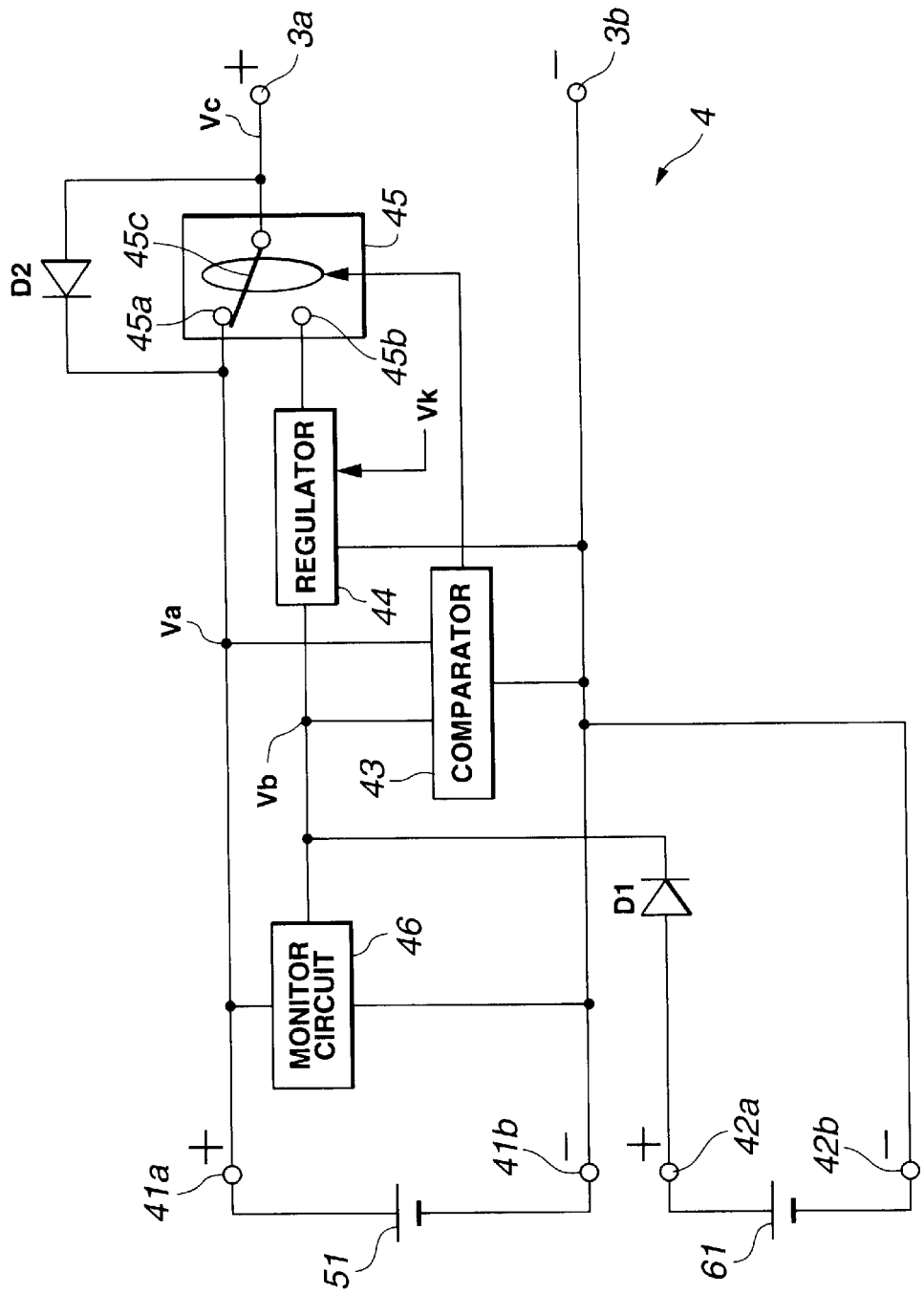
FIG. 6 shows another configuration of the control circuit.

Moreover, as shown in FIG. 6, it is possible to provide a monitor circuit 46 for monitoring, for example, whether the voltage of the secondary cell 51 and the primary cell 61 is 4.2V or below and whether the current flowing to the secondary cell 51 and the primary cell 61 is 1A or below. The monitor circuit 46 may cut off connection to the secondary cell 51 and the primary cell 61 to prevent overcharge and over-discharge when the aforementioned reference is exceeded.

Next, explanation will be given on a second embodiment of the present invention. It should be noted that like circuits are denoted with like symbols and their explanation will be omitted.

Figure 7:
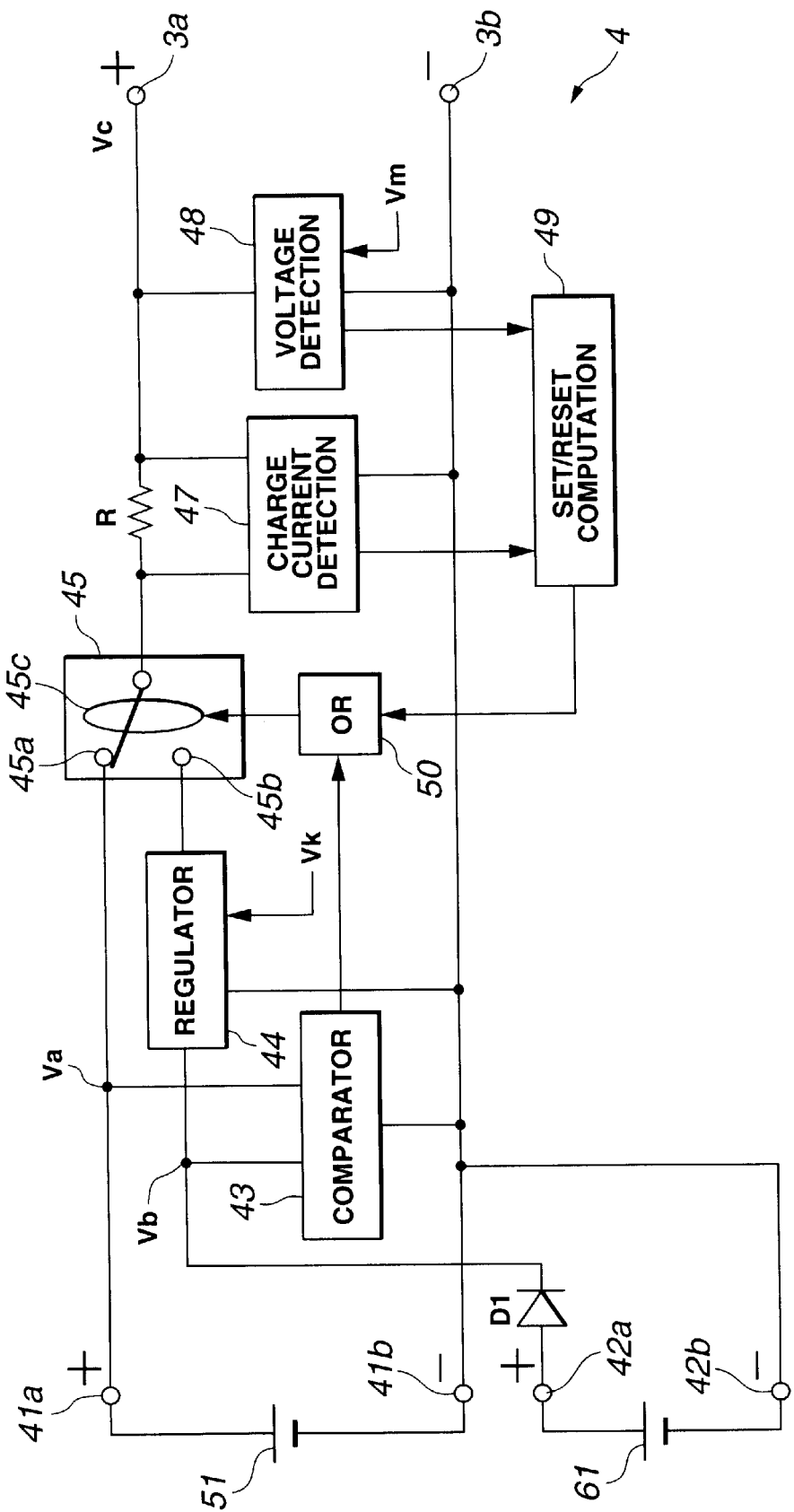
FIG. 7 shows still another configuration of the control circuit.

As shown in FIG. 7, the control circuit 3 according to the second embodiment includes: a diode D1 for preventing charge of the primary cell 61; a comparator 43 for comparing voltage of the secondary cell 51 to the voltage of the primary cell 61; a voltage regulator for regulating the voltage discharged from the primary cell to a predetermined value or beow; and a switching circuit 45 for switching between discharge from the secondary cell 51 or from the primary cell 61. It should be noted that these components are connected in the same way as in the first embodiment except for that the comparator 43 supplies an output signal to an OR gate 50 which will be detailed later and no diode D2 is included.

Furthermore, the control circuit 4 includes: a charge current detection circuit 47 for detecting a current during charge; a voltage detection circuit 48 for detecting a voltage between the positive electrode external terminal 3a and the negative electrode external terminal 3b; a set-reset computation circuit 49; and an OR gate 50 for outputting OR.

The switching circuit 45 has a select switch 45c connected via a resistor R to the positive electrode external terminal 3a. The charge current detection circuit 47 detects a current flowing to the resistor R during charge. When the charge current is zero, the charge current detection circuit 47 turns on the output signal for supply to the set-reset computation circuit 49. When the charge current is not zero, the charge current detection circuit 47 turns off the output signal.

The voltage detection circuit 48 turns on the output signal for supply to the set-reset computation circuit 49 when a voltage greater than a predetermined threshold value Vm is applied during charge from outside to the positive electrode external terminal 3a and to the negative electrode external terminal 3b. It should be noted that the voltage detection circuit 48 turns off the output signal when the voltage from outside is not greater than the predetermined threshold voltage value Vm.

Here, the predetermined threshold value Vm is set greater than the predetermined threshold value Vk. This prevents the following. That is, when the output voltage of the voltage regulator 44 is greater than the predetermined threshold value Vk, the output signal of the charge current detection circuit 47 is turned on even if no voltage is supplied from outside and the select switch 45c of the switching circuit 45 is switched to the secondary side. It should be noted when the secondary cell 51 is a lithium-ion cell, the threshold value is set to 4.1V.

The set-reset computation circuit 49 is an RS flip-flop circuit. When the output of the voltage detection circuit 48 is on, the set-reset computation circuit 49 turns on its output signal for supply to the OR gate 50. Moreover, the set-reset circuit turns off its output signal when the output signal of the charge current detection circuit 47 is on. Thus, set-reset computation circuit 49 detects that a charge voltage is applied from outside and turns on the output signal when charge is detected.

The OR gate 50 calculates OR of the output signal of the comparator 43 and the output signal from the set-reset computation circuit 49 for supply to the switching circuit 45. That is, the OR gate 50 supplies an output signal on to the switching circuit 45 when the output signal of the comparator 43 or the set-reset computation circuit 49 is on.

When the output signal of the OR gate 50 is on, the switching circuit 45 switches the select switch 45c so as to select the first selectable terminal 45a. When the output signal of the OR gate is off, the switching circuit 45 switches the select switch 45c so as to select the secondary selectable terminal 45b. That is, the switching circuit 45 switches to the secondary side when the voltage of the secondary cell is higher than the voltage of the primary cell 61 or when a charge voltage is applied from outside.

As has been described above, in the aforementioned battery pack 1, when a charge voltage is applied from the charger (not depicted), the switching circuit 45 is switched to the secondary side, the secondary cell 51 can be charged. Furthermore, in the battery pack 1, during discharge, the switching circuit 45 selects a terminal having a higher voltage and accordingly it is possible to discharge from a cell having a higher voltage.

Figure 8:
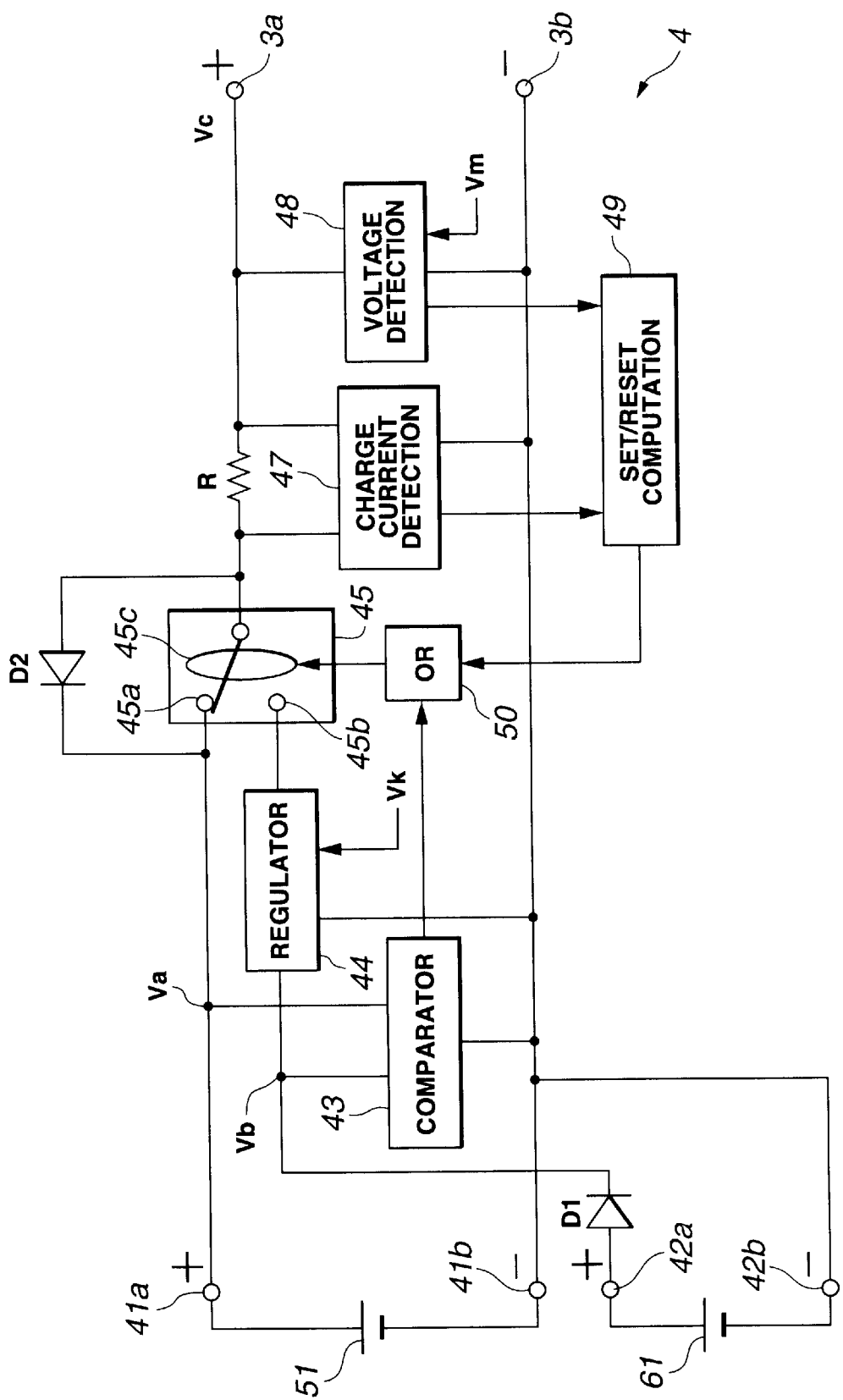
FIG. 8 shows yet another configuration of the control circuit.

Moreover, as shown in FIG. 8, like in the first embodiment, it is possible to provide a diode D2. That is, the cathode of the diode D2 can be connected to the positive electrode terminal 41a and the anode of the diode D2 can be connected to the select switch 45c. Thus, when no charge voltage is applied from outside and the primary cell 61 has a higher voltage than the secondary cell 51, it is possible to charge the secondary cell 51 using the voltage of the primary cell 61.

It should be noted that the present invention is not to be limited to the aforementioned embodiments but the present invention can be modified in various ways within a technical concept described in the claims.

As has been described above, the battery pack according to the present invention includes: select means for selecting a primary terminal connected to the primary cell or a secondary terminal connected to the secondary cell, so as to connect the selected terminal to the I/O terminal; comparison means for comparing the voltage of the primary cell and the secondary cell and, during discharge, controlling the select means so as to select the primary or the secondary terminal connected to a higher voltage, and during charge from an external power source, controlling the select means so as to select the secondary terminal; and inverse current preventing means for connecting the I/O terminal to the secondary cell, so that current flows from the I/O terminal to the secondary cell and not vice versa. Thus, during discharge, it is possible to output a higher voltage of the primary or the secondary cell and during charge of the secondary cell, it is possible to charge the secondary cell with a voltage from the primary cell or from an external power source. That is, not only the secondary cell but also the primary cell can be mounted so as to increase the battery capacity and it is possible to charge the secondary cell while the primary cell is mounted.

What is claimed is:

1. A battery pack comprising:

a primary cell;

a secondary cell;

an I/O terminal through which discharge voltage is output or charge voltage is input;

select means for selecting a primary terminal connected to the primary cell or a secondary terminal connected to the secondary cell, so as to connect the selected terminal to the I/O terminal;

comparison means for comparing the voltage of the primary cell and the secondary cell and, during discharge, controlling the select means so as to select the primary or the secondary terminal connected to a higher voltage, and during charge from an external power source, controlling the select means so as to select the secondary terminal; and inverse current preventing means for connecting the I/O terminal to the secondary cell, so that current flows from the I/O terminal to the secondary cell and not vice versa.

2. A battery pack as claimed in claim 1, the battery pack further comprising voltage regulating means which operates as follows: a voltage from the primary cell is compared to a reference voltage and if the voltage from the primary cell is higher than the reference voltage, the voltage from the primary cell is regulated to the reference voltage before being supplied to the primary terminal, and if the voltage from the primary cell is not higher than the reference voltage, the voltage from the primary cell is directly supplied to the primary terminal.

3. A battery pack as in claim 1, the battery pack further comprising inverse current preventing means for preventing between the primary cell and the primary terminal, a current flow from the primary terminal to the primary cell.

4. A battery pack as claimed in claim 1, the battery pack further comprising monitor means for monitoring voltage and/or current of the primary cell and the secondary cell and, when a monitored value of voltage and/or current is greater than a predetermined value, terminating charge or discharge.

* * * * *